UNITED STATES PATENT OFFICE 2,513,252

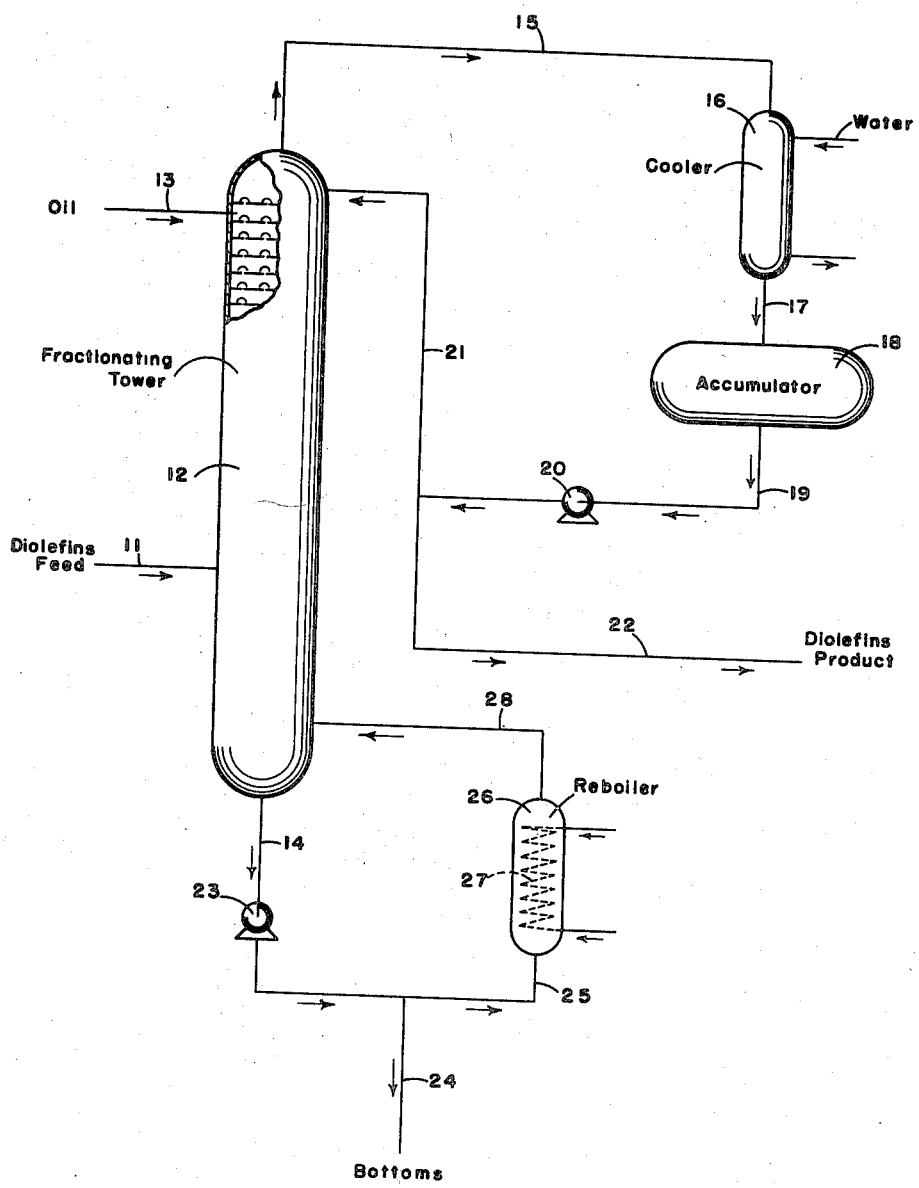

DISTILLATION OF DIOLEFINS

Ray Robertson, Goose Creek, Tex., assignor, by mesne assignments, to Standard Oil Development Company, Elizabeth, N. J., a corporation of Delaware Application May 31, 1946, Serial No. 673,443

5 Claims. (Cl. 202—57)

The present invention is directed to a method for purifying diolefins. More particularly, it is directed to a method for purifying diolefins in distillation equipment.

As a final step in the preparation of diolefins, such as butadiene from petroleum, it is customary to subject the product to a fractionation step wherein hydrocarbons of five or greater carbon atoms are eliminated from the material. This distillation step is necessary to allow production of a diolefin of satisfactory polymerization characteristics in the manufacture of synthetic rubber, such as that of the Buna-S type. Experience has demonstrated that when such an operation is carried out under pressures sufficiently high to condense the overhead vapors with the average industrial cooling water of 70° to 85° F. a hard crystalline polymer is formed which is quite objectionable in the equipment as will be further explained hereinafter.

Difficulties due to the formation of polymers occur most frequently in fractionating towers, where the formation of high molecular weight resin-like polymers on the heat exchange surfaces, bell caps, bell cap trays, downcomers, etc., is a constant source of trouble. Once started, the formation of this material is quite rapid and has frequently resulted in shutdowns because of plugging. In some cases serious damage to equipment has resulted when the polymer growth was inadvertently allowed to proceed to such an extent that steel tube bundles, bubble cap trays and other elements were distorted because of excessive pressure.

A careful study has indicated that the formation of these polymers is caused by the presence of oxygen in the equipment and may be accelerated by the presence of "seed" polymer particles. Others have disclosed various methods for suppressing the formation of these polymers as by circulating through the processing equipment an organic liquid free from oxygen, carrying in solution an oxidation inhibitor in moderate concentration, or by blanketing the feed stream storage tanks with an oxygen-free gas. While the afore-mentioned methods are successful to a great extent in eliminating the afore-mentioned difficulties due to formation of the polymers, after a period of time the polymer particles may begin growth in the equipment and form to such an extent that the equipment may be ruptured. Furthermore, once the polymer formation has begun, it is extremely difficult to stop and finally the equipment may be rendered inoperable by plugging of the various passageways. The pressures mentioned before are so enormous that frequently the essential parts may be destroyed by the tremendously high, localized pressures against the walls and tubes of the vessel by the polymer itself which has the unique property of not being bonded to the metallic surface and of expanding under the conditions of operation much like popcorn expands during the course of its preparation.

According to the present invention, the formation of these polymers is eliminated and diolefins of high purity are produced by a simple expedient. The present invention contemplates the addition to such equipment during its operation of a high boiling oil which has substantially little vapor pressure under the conditions of operation. It is contemplated that a high boiling oil in the boiling range of a gas oil may be employed. Generally, an amount of oil between 1% and 4% by volume of the feed stock will be used.

The high boiling oil should be injected at a point in the tower just below the top plate to give maximum protection of the interior equipment in the fractionating tower. While it is contemplated that the oil will preferably be injected near the top of the tower, it is within the spirit and scope of the invention to inject oil at other points in the tower and it is specifically contemplated that the oil may be injected at a plurality of points if required. It has been mentioned before that the oil should have substantially little vapor pressure under the conditions employed in the fractionating tower. It has also been mentioned that an oil in the gas oil boiling range satisfies these requirements. One oil in the gas oil boiling range, which has found satisfactory usage, is a naphthenic-type gas oil boiling between 600° and 750° F.

The nature and objects of the present invention will be further illustrated by reference to the drawing in which the single figure is a simplified flow diagram of one embodiment.

Referring now to the drawing, numeral 11 designates a feed line by way of which a vaporized diolefin, such as butadiene, is injected into tower 12 which may be a fractionating tower equipped with interior equipment, such as bubble cap plates or other suitable packing material, designed to give good contact between vapor and liquid. While the feed is shown entering tower 12 at a point slightly below the mid-point thereof, the feed may be introduced into the upper or lower section of the tower as desired. Preferably, however, it is introduced into the bottom section of tower 12. Preferably tower 12 is equipped with plates and bell caps and usually includes at least 30 plates. At a point in the uppermost section of tower 12 there is injected by way of line 13 a high boiling oil preferably in the gas oil boiling range. This oil is injected immediately below the uppermost plate and may be injected through suitable distributing means. The oil flows downwardly in the tower countercurrent to the feed flow and is withdrawn from the bottom of tower 12 by way of line 14 as will be described further hereinafter.

There is removed overhead from tower 12 by way of line 15 a vaporous fraction which is cooled and condensed in condenser 16 and the condensed liquid then flows by way of line 17 into accumulation zone 18. From accumulator 18 there is withdrawn a liquid stream by way of line 19 and pump 20 which is divided into two portions, one of which is injected back into the tower 12 by way of line 21 to provide reflux and the other portion is withdrawn from the tower by way of line 22 as product. The product is a diolefin of a purity in the range between 98 and 99.5%.

The bottoms fraction withdrawn by way of line 14 includes the oil injected by way of line 13 and heavy fractions boiling above the boiling range of the desired diolefin in an amount of usually less than one liquid volume per cent. The bottoms fraction is withdrawn by line 14 and pump 23 and is separated into two portions with one portion being discarded by way of line 24 and the other portion being discharged by way of line 25 into a reboiler 26 which is provided with a suitable heating means 27. In reboiler 26 the temperature is adjusted to withdraw by way of line 28 a vaporous fraction which is injected back into the tower 12 and by way of which heat is supplied for the distillation operation.

In one particular commercial operation, tower 12 was operated at a pressure between 50 and 60 lbs./sq. in. gauge with a temperature in the top of the tower between 100° and 110° F. The internal arrangement of tower 12 included 30 plates which allowed satisfactory fractionation of a butadiene stream at a reflux ratio (overhead to product) of 1.1 although a 1.5:1 ratio may be employed. Under these conditions the amount of high boiling oil injected by way of line 13 was 1.5 to 2.5 liquid volume per cent based on the feed. In the afore-mentioned commercial operation the amount of oil was 60 gallons per hour and the amount of vapor feed which entered the tower at a temperature of 115° F. was 2500 gallons per hour. The reboiler 27 maintained the temperature in the bottom of the tower at 220° F. The fraction withdrawn by way of line 24 which included $C_5$ hydrocarbons and the heavy oil injected by way of line 13 amounted to 65 gallons per hour.

The temperature of 100° to 110° F. at the top of the tower was maintained by pumping back to the top of the tower about 4000 gallons per hour of product at a temperature of 96° F. The product withdrawn by way of line 22 amounted to 2495 gallons per hour of butadiene of satisfactory purity.

The butadiene injected into tower 12 by way of line 11 may be obtained by any of the usual commercial methods of obtaining butadiene of substantial purity. One satisfactory method of concentrating butadiene from admixtures with other $C_4$ hydrocarbons is the solvent extraction method using ammoniacal cuprous ammonium acetate as the solvent, the substantially pure butadiene being recovered from the solvent by heating it.

The mechanism by which the present invention is successful in eliminating the growth of polymer in the distillation tower is not completely understood. One explanation of the beneficial effects is that the high boiling oil acts as an inhibitor or poison to the polymerization reaction caused by the injection of heat supplied by distillation for purification. It is believed that as an explanation of this mechanism that the high boiling oil disperses the butadiene and does not allow the points of polymer growth to accumulate. Another explanation of the beneficial effects may be attributed to the washing action of the high boiling oil injected into the top of tower 12.

The beneficial effects of the present invention will be further illustrated by a commercial operation before and after the adoption of the injection of high boiling oil into the tower. Prior to employment of the present invention, after two months' operation in distilling butadiene to recover a product better than 98% purity it was necessary to shut down for cleaning the equipment, the bell cap plates being fouled with considerable amounts of popcorn-type polymer of butadiene which, in some instances, had ruptured the equipment. After adoption of the present invention, the same distillation tower was operated from 3½ to 4½ months without requiring shut-down for cleaning. In these latter instances, the tower was much cleaner than it was prior to the adoption of the invention and cleaning was accomplished much more easily and in shorter time than would have been possible heretofore.

The nature and objects of the present invention having been completely described and illustrated, what I wish to claim as new and useful and secure by Letters Patent is:

1. A method for producing diolefins of a purity in excess of 98% which comprises distilling a contaminated diolefin stream in the presence of an amount in the range between 1% and 4% by volume of the contaminated diolefin of a high boiling petroleum gas oil having substantially no vapor pressure at the temperature of distillation.

2. A method for distilling a diolefin which comprises the steps of injecting a first stream of a heated diolefin into a distillation tower, injecting a second stream of a high boiling petroleum gas oil having substantially no vapor pressure under the conditions of distillation at a point substantially above the point of injection of the diolefin feed stream in an amount in the range between 1% and 4% by volume of the first stream and recovering as an overhead product a diolefin of a purity in excess of 98%.

3. A method for producing pure butadiene which comprises injecting a heated stream of butadiene into a distillation tower at a lowermost section of the tower, injecting a high boiling petroleum gas oil having substantially no vapor pressure at the conditions of distillation into an uppermost section of the tower in an amount in the range between 1% and 4% by volume of the butadiene stream and withdrawing a product of purity in excess of 98% from the top of the tower.

4. A method for distilling butadiene which includes the step of injecting a butadiene stream contaminated with $C_5$ hydrocarbons into a distillation tower, injecting in the uppermost section of the distillation tower an amount in the range of between 1% and 4% by volume based on the contaminated butadiene of a high boiling petroleum gas oil having substantially no vapor pressure under the conditions of distillation, adjusting the conditions of the distillation tower to recover overhead a fraction comprising substantially butadiene and withdrawing from the bottom of the tower a fraction comprising substantially the high boiling petroleum gas oil and $C_5$ hydrocarbons.

5. A method for distilling an impure butadiene fraction which includes the steps of charging a butadiene stream contaminated with higher boiling hydrocarbons into the lowermost section of a distillation tower maintained under distillation conditions, injecting into an upper portion of the tower from 1% to 4% by volume of the contaminated butadiene of a petroleum oil boiling in the gas oil boiling range, withdrawing from the bottom of the tower $C_5$ and heavier hydrocarbons, and recovering an overhead fraction comprising substantially pure butadiene.

RAY ROBERTSON.

REFERENCES CITED

The following references are of record in the file of this patent:

UNITED STATES PATENTS

| Number | Name | Date |
| --- | --- | --- |
| 2,171,795 | Kautter | Sept. 5, 1939 |
| 2,241,770 | Dreisbach | May 13, 1941 |
| 2,433,286 | McKinnis | Dec. 23, 1947 |
| 2,434,424 | Morris et al. | Jan. 1, 1948 |